(12) United States Patent
Jesme et al.

(10) Patent No.: US 12,362,471 B2
(45) Date of Patent: Jul. 15, 2025

(54) GRADIENT PERMITTIVITY FILM

(71) Applicant: 3M INNOVATIVE PROPERTIES COMPANY, St. Paul, MN (US)

(72) Inventors: Ronald D. Jesme, Plymouth, MN (US); Jaewon Kim, Woodbury, MN (US); Stephen J. Etzkorn, Woodbury, MN (US); Dipankar Ghosh, Oakdale, MN (US); Mohsen Salehi, Woodbury, MN (US); Guanglei Du, Horseheads, NY (US); John A. Wheatley, Stillwater, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 1318 days.

(21) Appl. No.: 17/045,582

(22) PCT Filed: Apr. 5, 2019

(86) PCT No.: PCT/IB2019/052829
§ 371 (c)(1),
(2) Date: Oct. 6, 2020

(87) PCT Pub. No.: WO2019/193571
PCT Pub. Date: Oct. 10, 2019

(65) Prior Publication Data
US 2021/0028538 A1    Jan. 28, 2021

Related U.S. Application Data

(60) Provisional application No. 62/654,151, filed on Apr. 6, 2018.

(51) Int. Cl.
*H01Q 1/42* (2006.01)
*C08F 220/10* (2006.01)
(Continued)

(52) U.S. Cl.
CPC .......... *H01Q 1/421* (2013.01); *C08F 220/10* (2013.01); *C08J 5/18* (2013.01); *C08K 3/40* (2013.01);
(Continued)

(58) Field of Classification Search
CPC ...... H01Q 1/421; H01Q 1/3233; H01Q 1/325; H01Q 17/004; H01Q 1/422; C08F 220/10;
(Continued)

(56) References Cited

U.S. PATENT DOCUMENTS 3,441,933 A * 4/1969 Tuinila ................. H01Q 17/004
342/4
4,767,726 A    8/1988 Marshall
(Continued)

FOREIGN PATENT DOCUMENTS

CN    103247851 A * 8/2013
CN    107056325 A * 8/2017 ............. C04B 28/00
(Continued)

OTHER PUBLICATIONS

Espacenet Translation of CN103247851A (Year: 2024).*
(Continued)

*Primary Examiner* — Michael Zhang
(74) *Attorney, Agent, or Firm* — Robert S. Moshrefzadeh

(57) ABSTRACT

Gradient permittivity films are described. In particular, gradient permittivity films that include a first continuous matrix of a first component having a first relative permittivity and a second component disposed within the continuous matrix having a second relative permittivity. The first permittivity is greater than the second permittivity for at least one wavelength between 20 GHz and 300 GHz. Such films may be useful in improving the signal to noise ratio for transmitting and receiving units behind a protective cover.

40 Claims, 8 Drawing Sheets

(51) Int. Cl.

| | |
|---|---|
| *C08J 5/18* | (2006.01) |
| *C08K 3/40* | (2006.01) |
| *C08K 7/28* | (2006.01) |
| *C09J 7/24* | (2018.01) |
| *C09J 11/04* | (2006.01) |

(52) U.S. Cl.
CPC ................................. *C08K 7/28* (2013.01); *C09J 7/24* (2018.01); *C09J 11/04* (2013.01); C08J 2333/04 (2013.01); C09J 2301/41 (2020.08); C09J 2433/006 (2013.01)

(58) Field of Classification Search
CPC ........... C08J 5/18; C08J 2333/04; C08K 3/40; C08K 7/28; C09J 7/24; C09J 11/04; C09J 2301/41; C09J 2433/006
See application file for complete search history.

(56) References Cited

U.S. PATENT DOCUMENTS

| | | | |
|---|---|---|---|
| 4,956,393 | A | 9/1990 | Boyd et al. |
| 5,017,939 | A | 5/1991 | Wu |
| 5,134,421 | A | 7/1992 | Boyd |
| 5,528,254 | A | 6/1996 | Howng |
| 6,406,783 | B1 | 6/2002 | Phillips |
| 6,433,936 | B1 | 8/2002 | Carpenter |
| 11,811,139 | B2 * | 11/2023 | Kim ..................... H01Q 1/422 |
| 2005/0128134 | A1 | 6/2005 | Shinoda |
| 2006/0003598 | A1 | 1/2006 | Li |
| 2006/0109124 | A1 | 5/2006 | Dixon |
| 2010/0078198 | A1 | 4/2010 | Harris |
| 2014/0159976 | A1 | 6/2014 | De Rochemont |
| 2015/0380824 | A1 | 12/2015 | Tayfeh Aligodarz |
| 2016/0005552 | A1 | 1/2016 | Blum |
| 2016/0109971 | A1 | 4/2016 | Harada |
| 2021/0021050 | A1 * | 1/2021 | Kim ..................... H01Q 1/422 |
| 2021/0050673 | A1 | 2/2021 | Ghosh |

FOREIGN PATENT DOCUMENTS

| | | |
|---|---|---|
| JP | 54-83741 | 7/1979 |
| JP | 2004311326 A | 11/2004 |
| WO | WO 2014-187605 | 11/2014 |
| WO | WO 2018-081394 | 5/2018 |
| WO | WO 2019-193571 | 10/2019 |
| WO | WO 2019-195758 | 10/2019 |

OTHER PUBLICATIONS

Altair, "Automotive Radars—Antenna Design, Integration & Channel Modeling", A White Paper from Altair Engineering, Inc. (www.altair.com) May 2016, 3 pages.
Fitzek, "Automotive Radome Design—Fishnet Structure for 79 GHz", Proc. German Microwave Conference (GeMIC), 2010, pp. 146-149.
Fitzek, "Comparison of Matching Layers for Automotive Radome Design", Advances in Radio Science (ARS), 2010, vol. 8, pp. 49-54.
International Search Report for PCT International Application No. PCT/IB2019/052829, mailed on Aug. 29, 2019, 2 pages.
International Search Report for PCT International Application No. PCT/US2019/026106, mailed on Jul. 5, 2019, 3 pages.
Reuven, "Sandwich Radomes", Radome Electromagnetic Theory and Design, Apr. 10, 2018, pp. 15-38.
Supplementary European Search Report for EP Application No. 19781467, dated Dec. 22, 2021, 2 pages.

\* cited by examiner

GRADIENT PERMITTIVITY FILM

CROSS REFERENCE TO RELATED APPLICATIONS

This application is a national stage filing under 35 U.S.C. 371 of PCT/IB2019/052829, filed Apr. 5, 2019, which claims the benefit of Provisional Application No. 62/654,151, filed Apr. 6, 2018, the disclosure of which is incorporated by reference in its/their entirety herein.

BACKGROUND

Radio waves may be reflected at a sharp boundary between air and a material having a higher relative permittivity. Such reflection may not be desirable in certain applications.

SUMMARY

In one embodiment, the present description relates to a gradient permittivity film. The gradient permittivity film has a first major surface and an opposing second major surface separated by a thickness. The gradient permittivity film includes a first continuous matrix of a first component having a first relative permittivity $\varepsilon_{r1}$ and a second component disposed within the continuous matrix having a second relative permittivity $\varepsilon_{r2}$. $\varepsilon_{r1}$ is greater than $\varepsilon_{r2}$ for at least one wavelength range, the wavelength range being between 20 GHz and 300 GHz. The relative permittivity of a first half including the half of the thickness of the gradient permittivity film closest to the first major surface is lower by at least 10% than a relative permittivity of a second half including the half of the thickness closest to the second major surface, for the at least one wavelength within the wavelength range. The gradient permittivity film has a visible haze greater than 50% or a transmission of visible light less than 50%, and both the first major surface and the second major surface are primarily the first component.

DETAILED DESCRIPTION

Figure 1:
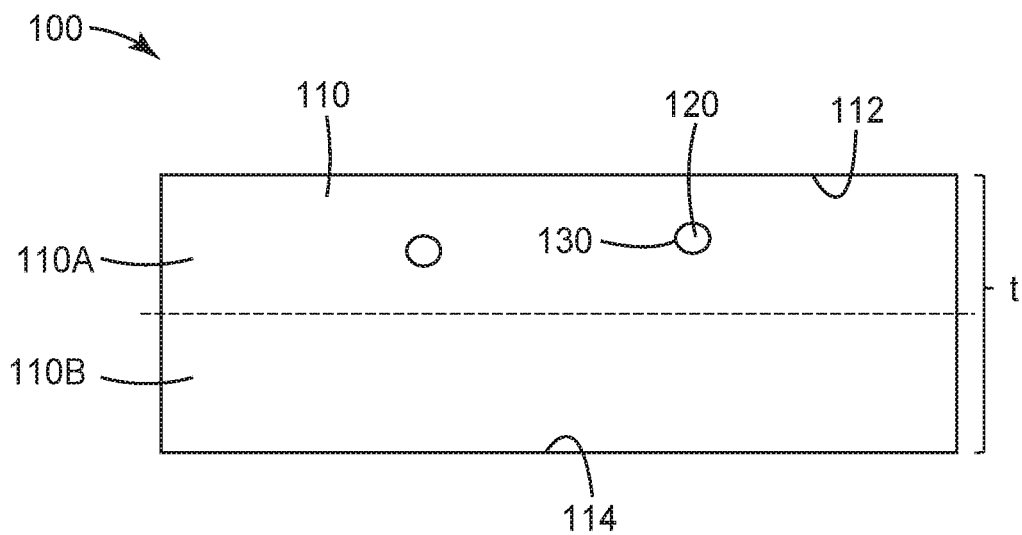
FIG. 1 is a side elevation cross section of a gradient permittivity film.

Radio wave generating and receiving units, such as radar (radio detection and ranging) units, may be useful in a diverse and growing application space. For example, as automobiles incorporate more and more sensors in order to enhance driver safety, sense and warn about vehicle surroundings and ambient conditions, and to enable partial or full autonomous driving functions, one or more radar units may be incorporated. For automotive radar applications, microwave generation and receiving units may be used, and so for purposes of this application "radar" and "radio waves" shall include microwave range frequencies as well. For power consumption, safety, and regulatory reasons, these radar units may be relatively low power when compared to those used for, as an example, air traffic monitoring applications. Accordingly, the signal to noise ratios of these lower power units may be more sensitive to interference or attenuation.

In order to protect these radar units from dirt buildup or weather elements such as snow and rain, or, in the case of rotating or moving components, to protect people from injury or accidental damage, the unit is typically protected with a cover. In some cases, this protective cover is referred to as a radome. Alternatively or additionally, these units are sometimes embedded within the body of the vehicle. In some embodiments, these units are placed behind or within the bumper fascia or another vehicle fascia, which serves as the protective cover. Depending on the direction of interest, these radar units can be placed at any location on the vehicle. Typically, they are arranged so that the least amount of material is disposed between the radar unit and its potential—or intended—targets for detection.

However, because a protective cover is typically necessary or desirable to use in conjunction with these radar units, the radio waves generated by a radio wave generating unit and received by a radio wave receiving unit must pass through a interface including a sudden increase in electrical permittivity. Relative permittivity for a given frequency, which, as used herein is the ratio of a material's permittivity to the permittivity of a vacuum, measures the resistance of a material to forming an electric field within itself. Sharp changes in this value—as would be encountered by a radio wave travelling in air at an interface with a non-air material, such as a plastic vehicle fascia, will cause at least some of the radio wave to be reflected at this boundary. Since these boundaries occur twice for each pass through the vehicle fascia (once entering the material and once exiting the material), the losses represented by reflections in a non-desirable direction (for radio waves generated by the radio wave generating unit, back toward the radio wave generating unit, and for radio waves to be received by the radio wave receiving unit, back away from the radio wave receiving unit), the losses can become significant and make the signal less effective. Specifically, this can happen either because a returning signal is significantly attenuated before being detected by the radio wave receiving unit or because a transmitted signal is reflected and detected, giving a strong false signal, either mechanism reducing the ability to discern a desirable signal from noise. Similarly, antennas for telecommunications or, indeed, for any electronic device including a transmitting and receiving unit may encounter the same or similar problems; i.e., signal losses or noise increases attributable to a sharp transition between medium permittivity.

Gradient permittivity films—analogous to antireflection films or coatings for optical interfaces, provide a smooth or stepped change in permittivity (versus a smooth or stepped change in refractive index for antireflection films)—from a first medium to a second medium. Typically, the gradient permittivity film's permittivity varies from being closest to the permittivity of the first medium to being closest to the permittivity of the second medium. For example, the gradient permittivity film could have a varying permittivity that starts close to the permittivity of air on one side and transitions to the permittivity of a plastic vehicle fascia on the other side (which would be attached to the plastic vehicle fascia). This smooth or stepped transition can significantly reduce the dielectric boundary reflection that otherwise occurs at these sharp transitions.

Previous gradient permittivity films typically use varying bulk three-dimensional shapes, such as cones or pyramids. However, in a typical use environment where these films may be exposed to dirt accumulation and weather conditions, these films may become contaminated and ineffective, because they rely on the presence of air in order to provide the gradient in permittivity. Films described herein may be less susceptible to debris and contaminant ingress because a limited portion of the air or gas fraction is exposed to external elements, or in some embodiments the gas volume fraction is completely sealed within the film. In other words, both major surfaces of the gradient permittivity film are primarily a continuous matrix component.

FIG. 1 is a side elevation cross section of a gradient permittivity film. Gradient permittivity film 100 includes first half 110A closest to first major surface 112, second half 110B closest to second major surface 114, continuous matrix of first component 110, with second component 120 disposed within the continuous matrix and also disposed within third component 130. The thickness of the film is indicated by t and includes both halves of the gradient permittivity film. Gradient permittivity film 100 represents a simple embodiment of a gradient permittivity film. In the embodiment of FIG. 1, the continuous matrix is a bulk volume of the first component. In some embodiments, this first component could be a resin, plastic, polymeric material or any other suitable material selected for its permittivity, mechanical properties, thermal or environmental stability, ease of processing, or any combination of the preceding. In some embodiments, the continuous matrix of the first component is selected to match the permittivity and or composition of a material it is intended to be attached to for its designed application.

The first continuous matrix of the first component has a first relative permittivity $\varepsilon_{r1}$. The second component has a second relative permittivity $\varepsilon_{r2}$, where $\varepsilon_{r1}$ is greater than $\varepsilon_{r2}$ for at least one wavelength within a wavelength range. In some embodiments, the wavelength range may be any wavelength range within the radio and microwave wavelength range. In some embodiments, the wavelength range may be between 20 GHz and 300 GHz. In some embodiments, the wavelength range may be between 20 GHz and 100 GHz. In some embodiments, the wavelength range may be between 20 GHz and 81 GHz. In some embodiments, the wavelength range may be between 20 GHz and 30 GHz.

In some embodiments, the second component is air or another inert gas. In some embodiments, the second component is a partial vacuum. Given the low relative permittivity of air, gasses, or partial vacuums, the inclusion of the second component within the gradient permittivity film lowers the effective permittivity of that portion of the film. Averaged over the volume for that portion of the thickness, a half or portion of gradient permittivity film 100 that includes more of second component 120 will have a lower effective permittivity than a half or portion of gradient permittivity film 100 that contains less or none of second component 120. In some embodiments, this difference in permittivity is at least 10%. First half 110A, which is designed to have a lower permittivity than second half 110B, includes second component 120 disposed within continuous matrix of first component 110, while second half 110B does not include second component 120.

Note that in the illustration of FIG. 1 gradient permittivity film 100 is represented as a single layer. Through certain manufacturing methods (described in more detail elsewhere in this description), it is possible to achieve a single layer film that has a gradient in permittivity.

Second component 120 is disposed within third component 130, in the illustration of FIG. 1. In some embodiments, second component 120 is freely disposed within the continuous matrix of the first component—such as in the form of air or gas bubbles. In some embodiments, nanoparticles such as silsesquioxane nanoparticles can be used to add porosity to a polymer layer, such as an epoxy or silicone layer.

However, in some embodiments, second component 120 is disposed within a different material. For example, in some embodiments, second component 120 is disposed within glass, making the spheres in FIG. 1 glass bubbles or microbubbles. Glass microbubbles are generally formed by simultaneous fusion of glass-forming components and the expansion of the fused mass. See generally U.S. Pat. No. 4,767,726 (Marshall). Similarly, polymeric or plastic microbubbles (such as polyethylene, polypropylene, poly (methyl methacrylate) and filled with an inert gas or air may be used. In some embodiments, cenospheres—lightweight spheres typically formed from silica or alumina and filled with air or other inert gas and produced as a byproduct of coal combustion—may be used. In some embodiments, ceramic particles may be used. These ceramic particles may be porous and include air or another inert gas. In some embodiments, any of the particles described herein may be coated with or may include an absorber composite. The absorber composite may include at least one of ceramic filler materials, conductive filler materials, or magnetic filler materials. The conductive filler materials may include, for example, carbon black, carbon bubbles, carbon foam, graphene, carbon fibers, graphite, carbon nanotubes, metal particles, metal nanoparticles, metal alloy particles, metal nanowires, polyacrylonitrile fibers, or conductive coated particles. The ceramic material fillers may include, for example, cupric oxide or titanium monoxide. The magnetic filler materials may include, for example, Sendust, carbonyl iron, permalloy, ferrites, or garnets. The third component has a third relative permittivity $\varepsilon_{r3}$, and $\varepsilon_{r2} \leq \varepsilon_{r3}$ for the wavelength within the wavelength range. Any combination or blend of particles and free voids or bubbles can be used within the continuous matrix of the first component.

The thickness t may be any suitable value, taking into account physical robustness and environmental stability (such as resistant to heat-cool cycle warping). Additionally, the suitable thickness may also be bounded as being greater than a minimum thickness so that a radio wave experiences and interacts with the intermediate change in permittivity. If the thickness is too thin, an incident electromagnetic wave will not interact with the gradient permittivity film. Or, in the case of multilayer gradient permittivity films, an electromagnetic wave will interact with the multilayer gradient permittivity film as if it were a single layer of a blended effective permittivity—instead of, as desired, as a film of stepped permittivity. If a film is too thick, it may not be effectively attached or may not remain attached to a surface, and may be less flexible or conformable than desired.

The distribution of the second component or its volume fraction within the continuous matrix may vary along one or more non-thickness directions of the film. In some embodiments, the variation may be monotonic. In some embodiments, due to the requisite size and distribution of second component within the continuous matrix of the first component, gradient permittivity films as described herein may have high visible haze or low visible light transmission. In some embodiments, visible haze may be greater than 50%. In some embodiments, visible light transmission may be less than 50%.

Figure 2:
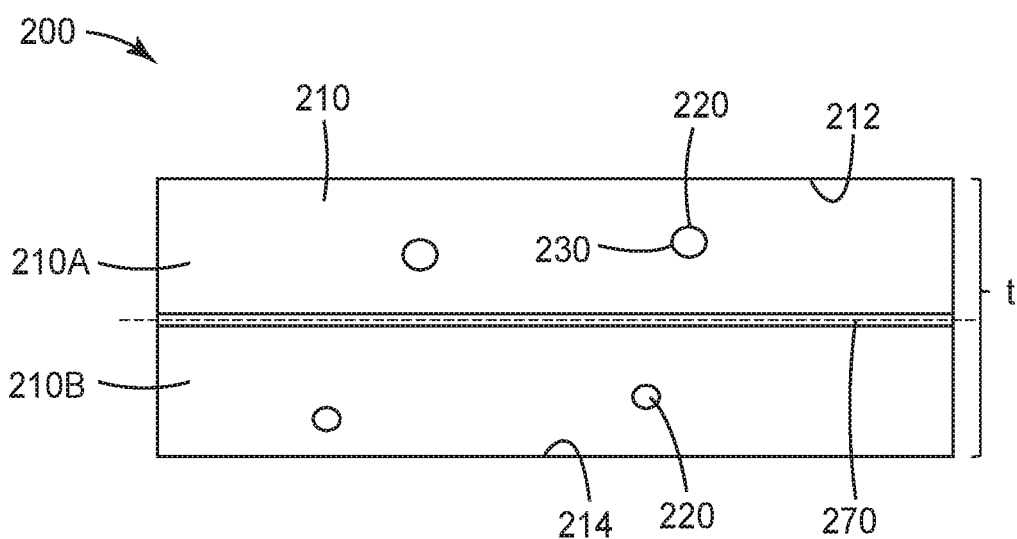
FIG. 2 is a side elevation cross section of another gradient permittivity film.

FIG. 2 is a side elevation cross section of another gradient permittivity film. Gradient permittivity film 200 includes first half 210A closest to first major surface 212 and second half 210B closest to second major surface 214 and laminated together by adhesive 270, continuous matrix of first component 210. with second component disposed within the continuous matrix and optionally disposed within third component 230. Gradient permittivity film 200 in FIG. 2 is similar and corresponds generally to gradient permittivity film 100 of FIG. 1. However, FIG. 2 illustrates two portions of film—first half 210A and 210B—that are laminated to each other by adhesive 270 instead of the unitary construction in FIG. 1. Further, FIG. 2 illustrates that second component 220 can be freely disposed within continuous matrix of first component 210 and not within a third component. In the gradient permittivity films described herein, the volume fraction of the second component may vary between any of the portions of the thickness of the gradient permittivity film through either changing either the size, shape, or density of the bubbles, voids, or other components, such as glass microbubbles or cenospheres present in the continuous matrix. In some embodiments, this difference in volume fraction of the second component is at least 10% between the two halves.

Any suitable adhesive may be used as adhesive 270. For example, pressure sensitive adhesives, UV-curable adhesives, silicone-based adhesives, urethane-based adhesives or any other suitable adhesive or combination of adhesives may be used to bond the halves of gradient permittivity film 200 together.

Figure 3:
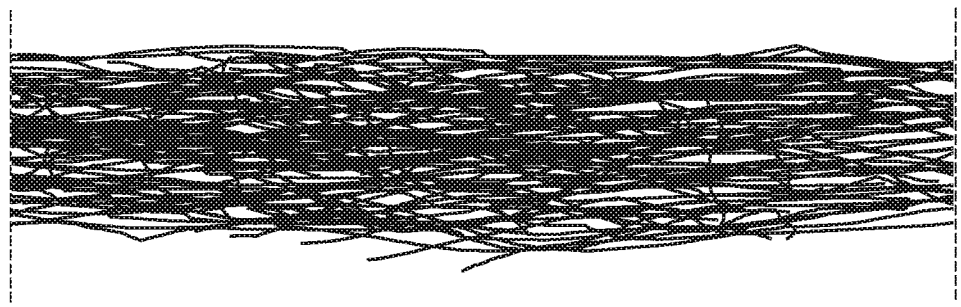
FIG. 3 is a side elevation cross section of a nonwoven component for a gradient permittivity film.

FIG. 3 is a side elevation cross section of a nonwoven component 300 for a gradient permittivity film. Nonwoven component 300 has intrinsic porosity and contains at least some inert gas (e.g., air) volume fraction provided within the continuous matrix of the nonwoven component. A gradient permittivity film may use a nonwoven component as part of a multilayer stack, wherein the film varies in effective permittivity by controlling or selecting the porosity of the various layers of the nonwoven component. In some embodiments, the porosity of a single nonwoven layer can be controlled along the thickness direction such that a gradient in permittivity is present. Suitable nonwoven components may include spunbond nonwovens, flashspun nonwovens, melt-blown nonwovens, staple nowovens, and may include glass or plastic fibers. In some embodiments, the glass or plastic fibers can themselves contain an inert gas or air component, which may help further tune or control the permittivity gradient along the thickness direction or possibly also in one or more non-thickness directions. Nonwoven components may be used in combination with any other layer described herein, including with one or more layers of a resin matrix with voids or bubbles (plastic or glass or free) disposed therein. Alternatively, and especially in the case of glass or polymer fibers including voids or microbubbles, such fibers can be woven or arranged to form a gradient permittivity film.

Figure 4:
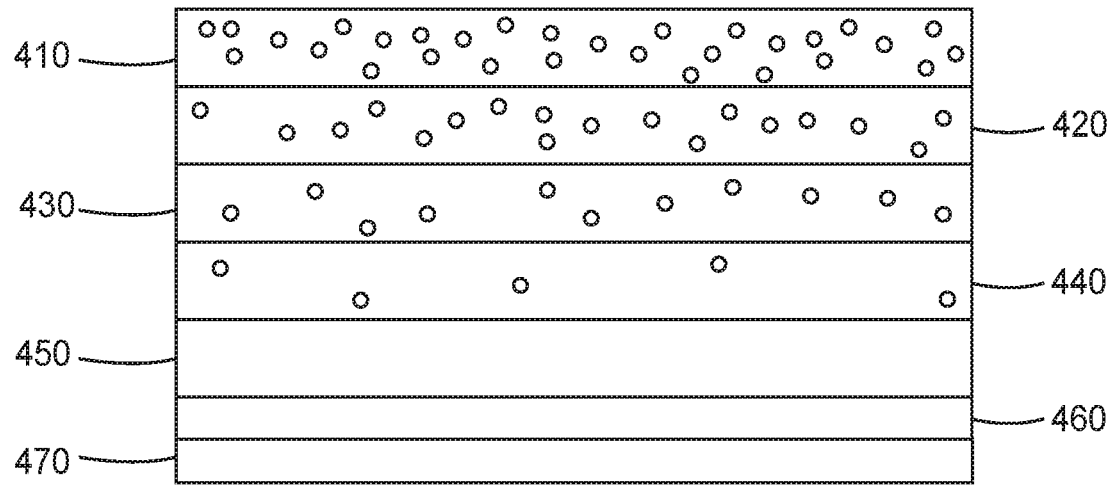
FIG. 4 is a side elevation cross section of a multilayer gradient permittivity tape.

FIG. 4 is a side elevation cross section of a multilayer gradient permittivity tape. Gradient permittivity tape 400 includes first layer 410, second layer 420, third layer 430, fourth layer 440, fifth layer 450, adhesive layer 460, and backing layer 470. Gradient permittivity tape 400 in FIG. 4 illustrates a multilayer stack design where each of first layer 410, second layer 420, third layer 430, and fourth layer 440 have a different effective permittivity and represent a stepped change moving along the thickness direction of the gradient permittivity tape (up and down in the reference frame of FIG. 4). Each of the layers in FIG. 4 may be formed separately and attached, such as with an adhesive or through another process such as heat lamination, or they may be formed successively with varying process conditions or input material (for example, different resins with different loadings of glass or plastic microbubbles). FIG. 4 is a simplified illustration, and the boundaries between each of the layers is not necessarily as flat and defined in real-world manufactured articles. In some embodiments, the continuous matrix for each of the layers is the same material.

Gradient permittivity tape also includes adhesive layer 460 and backing layer 470. Adhesive layer 460 may include any suitable adhesives, including pressure sensitive adhesives, repositionable adhesives, or stretch releasable adhesives. Adhesive layer 460 may be any suitable thickness to provide secure contact to a surface with which it is attached. Adhesive layer 460 may alternatively include curable components, such as UV-curable components or heat curable components. In some embodiments, adhesive layer 460 may also include one or more of the components including the inert gas or air, such as glass or plastic microbubbles, cenospheres, ceramic particles, or free voids, in order to further control the permittivity gradient.

Backing layer 470 may include any suitable film or layer to protect the adhesive properties of adhesive layer 460 and also prevent accidental adhesion of gradient permittivity tape 400 to undesired surfaces. Suitable materials for backing layer 470 include plastic films, coated or uncoated paper, or the like. Backing layer 470 may be selected so that it itself does not have strong adhesion to adhesive layer 460, and therefore is easily removable by hand or with limited tools.

Figure 5:
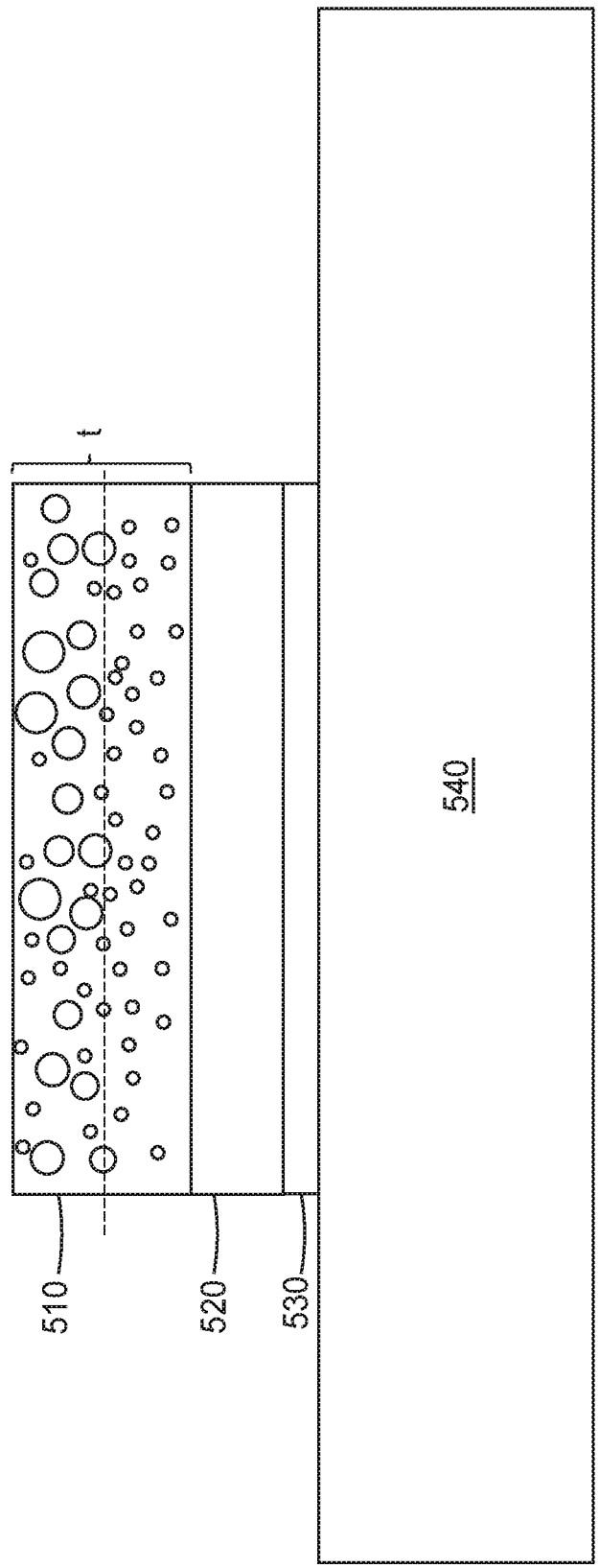
FIG. 5 is a side elevation cross section of a single layer gradient permittivity film attached to a surface.

FIG. 5 is a side elevation cross section of a single layer gradient permittivity film attached to a surface. The gradient permittivity tape includes single layer gradient permittivity film 510 disposed on substrate 520 and attached to surface 540 via adhesive layer 530. Gradient permittivity 510 in FIG. 5 is a single layer gradient permittivity film. In some embodiments, a single layer gradient permittivity film may be formed through disposing differently-sized or shaped microbubbles (in glass or plastic) cenospheres, air or other inert gas bubbles or a combination thereof in an uncured flowable material. Such a flowable material may be disposed or coated onto substrate 520, through any suitable method such as dip coating, spin coating, spray or conformal coating, or even printing. When the particles or bubbles are allowed to flow within the material, on average those having a larger air or gas volume fraction will rise to the top of the material, while those with a smaller air or gas volume fraction will remain where they were or will sink toward the bottom. Accordingly, it is possible to create a gradient permittivity along the thickness, within a single layer. As in gradient permittivity film 100 in FIG. 1, the difference in the permittivity between the top and bottom halves of gradient permittivity film 510 may be at least 10%.

The gradient permittivity film of FIG. 5 is attached to surface 540 via adhesive layer 530. In some embodiments, gradient permittivity film 510 may have been configured as a tape, with the adhesive layer disposed on the gradient permittivity film prior to attachment to surface 540, as described and shown in FIG. 4. In some embodiments, gradient permittivity film 510 is attached to surface 540 by application of adhesive layer 530 at or near the time of attachment. Any suitable adhesive may be used.

Surface 540 may be, in some embodiments, a vehicle fascia. Surface 540 may be a radome. In some embodiments, surface 540 may be a different protective cover or casing, such as an antenna covering or the external surface of an electronic device. In some embodiments, although FIG. 5 illustrates one gradient permittivity film attached to the surface, more than one gradient permittivity tape may be attached to the surface in the same or similar manner. In some embodiments, a second gradient permittivity film is attached to the opposite side of surface 540, with its half having lower relative permittivity being disposed away from surface 540. Surface 540 may be curved or nonplanar, and gradient permittivity film or a tape including such a film may be similarly formed, flexible, or compliant in order to adhere closely to the shape of surface 540.

In some embodiments, at a location of attachment of the gradient permittivity film to the surface, a relative permittivity of the surface is within 10% of the relative permittivity of the continuous matrix. In particular, if different layers within the gradient permittivity film have different continuous matrix materials, then the continuous matrix nearest to the surface is the one to be within 10% of the relative permittivity of the surface. In some embodiments, the relative permittivity of the surface may be within 5% of the relative permittivity of the continuous matrix.

Gradient permittivity films described herein may be post-processed in order to further tune the properties and performance of these films. For example, gradient permittivity films described here in may be heated or thinned in order to selectively change the properties at a certain point or points on the film. In some embodiments, gradient permittivity films described herein may be perforated to selectively alter the permittivity characteristics at certain points at the film. In some embodiments these perforations have regular shapes and/or sizes. In some embodiments, these perforations are differently sized or shaped. In some embodiments, these perforations are round. In some embodiments, the perforations vary in size, shape, or density over one or more non-thickness directions.

EXAMPLES

A sample of 4-layer structures were coated to facilitate the radar transmission measurements; for testing configurations this samples was either fastened to either bare or painted 1.7 mm polypropylene plates to simulate automotive bumper material. The air volume for each layer of the three examples of 4-layer structure is provided in the form of hollow glass beads (3M Glass Bubbles K1) embedded in a matrix of 55% silicone acrylate (Sartomer CN990) and 45% tetra hydrofurfuryl acrylate (Sartomer SR285). In each example, each layer of the construction was 250 μm, for a total thickness of 1 mm.

The three examples differ from each other in that the density of glass beads, by % volume, is different for each of the 4 layers in the structure. For relative measurements, comparative example 1 (CE-1) is provided as a bare 1.7 mm polypropylene plate (no film) and comparative example 2 is provided as same 1.7 mm polypropylene plate with metallic gray paint layer of sufficient thickness so as to be visually opaque. The metallic gray paint mixture is 25% DBC9700 (black) commercially available from PPG and 25% Nissan silver (KYO Nissan equivalent available from Dupont P2929) and 50% DT885 reducer/solvent also from PPG.

TABLE 1

Example description

| | Density of Glass Beads, % volume | | |
|---|---|---|---|
| Layer # | Example 1 | Example 2 | Example 3 |
| 1 | 22% | 22% | 22% |
| 2 | 33% | 33% | 33% |
| 3 | 55% | 55% | 55% |
| 4 | 70% | 75% | 60% |

The percent bead density by volume for each layer, as shown in the table above, is expected to directly influence the permittivity of the layer. The expected permittivity as a function of glass bead vol % is shown in Table 2.

TABLE 2

Calculated relative permittivity expected for differing glass bead vol % in layer

| Vol % | Permittivity |
|---|---|
| 22% | 2.40 |
| 23% | 2.38 |
| 24% | 2.36 |
| 25% | 2.34 |
| 26% | 2.32 |
| 27% | 2.31 |
| 28% | 2.29 |
| 29% | 2.27 |
| 30% | 2.25 |
| 31% | 2.23 |
| 32% | 2.21 |
| 33% | 2.19 |
| 34% | 2.17 |
| 35% | 2.15 |
| 36% | 2.13 |
| 37% | 2.11 |
| 38% | 2.09 |
| 39% | 2.08 |
| 40% | 2.06 |
| 41% | 2.04 |
| 42% | 2.02 |
| 43% | 2.00 |
| 44% | 1.98 |
| 45% | 1.97 |
| 46% | 1.95 |
| 47% | 1.93 |
| 48% | 1.91 |
| 49% | 1.89 |
| 50% | 1.88 |
| 51% | 1.86 |
| 52% | 1.84 |
| 53% | 1.83 |
| 54% | 1.81 |
| 55% | 1.79 |
| 56% | 1.77 |
| 57% | 1.76 |
| 58% | 1.74 |
| 59% | 1.72 |
| 60% | 1.71 |
| 61% | 1.69 |
| 62% | 1.67 |
| 63% | 1.66 |
| 64% | 1.64 |
| 65% | 1.63 |
| 66% | 1.61 |
| 67% | 1.60 |
| 68% | 1.58 |
| 69% | 1.56 |
| 70% | 1.55 |
| 71% | 1.53 |
| 72% | 1.52 |
| 73% | 1.50 |
| 74% | 1.49 |
| 75% | 1.47 |
| 76% | 1.46 |

TABLE 2-continued

Calculated relative permittivity expected
for differing glass bead vol % in layer

| Vol % | Permittivity |
|---|---|
| 77% | 1.45 |
| 78% | 1.43 |
| 79% | 1.42 |
| 80% | 1.40 |

Radar Attenuation Test Method

The test set up included three essential pieces: (A) a radar testing unit, (B) the sample, positioned about 20 mm from this radar unit and (C) a detection target.

The radar testing unit was a commercially available INRAS RadarBook with MIMO 77 GHz front-end. The unit provides a measure, Rx signal [dBV], which is a measure of the relative measurement of the detected radar signal reflected by the sample and detection target combined. The output from the testing unit provides a signature of measured signal versus distance from the test head. This is reported simply as "radar signal plot" in measurement results section in form of figures showing graph of Rx versus distance from radar testing unit.

The sample's proximity to the radar unit and attachment of the multi-layers to the 1.7 mm thick polypropylene plate was designed to simulate the effect of a bumper/fascia on the radar signal. Although the distance from the radar unit to the plate was nominally 20 mm, this was adjusted slightly between measurements to obtain case for both maximum and minimum target signal. Typical slight adjustments were less than about 2 mm from 20 mm nominal distance. This adjustment was expected to demonstrate the variability for the measurements due to subtle positioning of samples relative to radar source. In an ideal case, the difference in target signal between the minimum and maximum would be minimized. In the examples shown, a reduction in this variation is seen of around 5 dB compared to the variation seen in the bare plate alone. As the samples become less visible to the radar source, less variability with sample adjustment is observed.

For the detection target, a copper plate was placed at approximately 3.5 m from the radar unit. This target distance shows up as peak in the radar unit output of Rx versus distance.

Measurement Results

Figure 6:
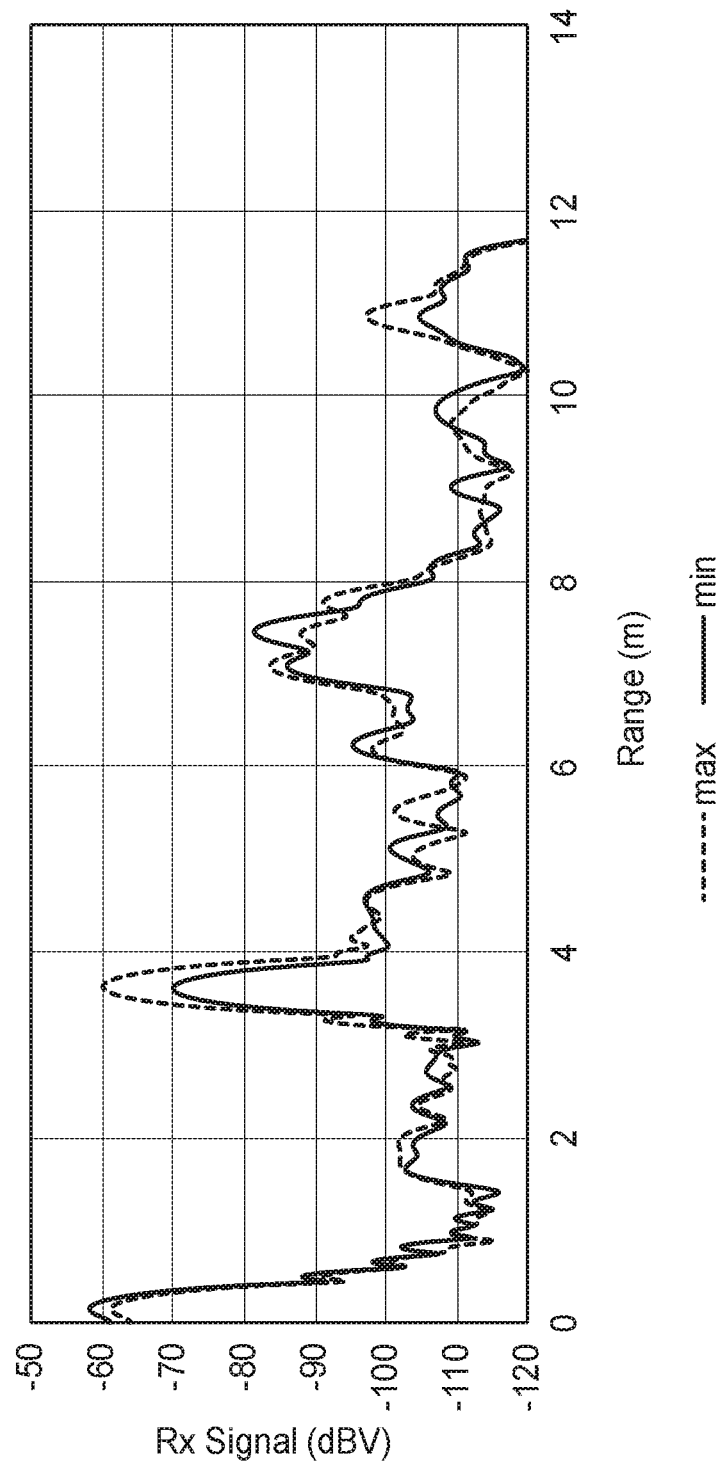
FIG. 6 is a graph of radar signal plots from Comparative Example 1.
Figure 7:
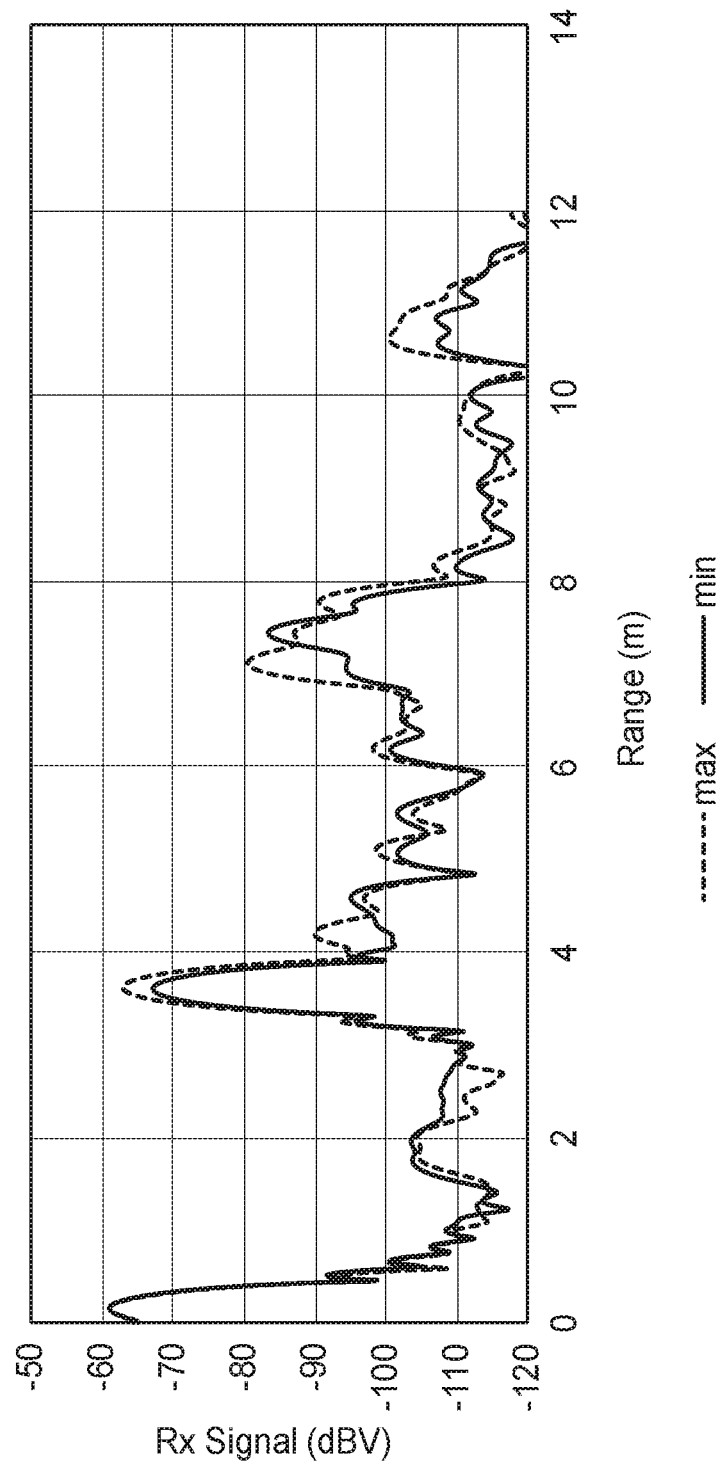
FIG. 7 is a graph of radar signal plots from Example 1.
Figure 8:
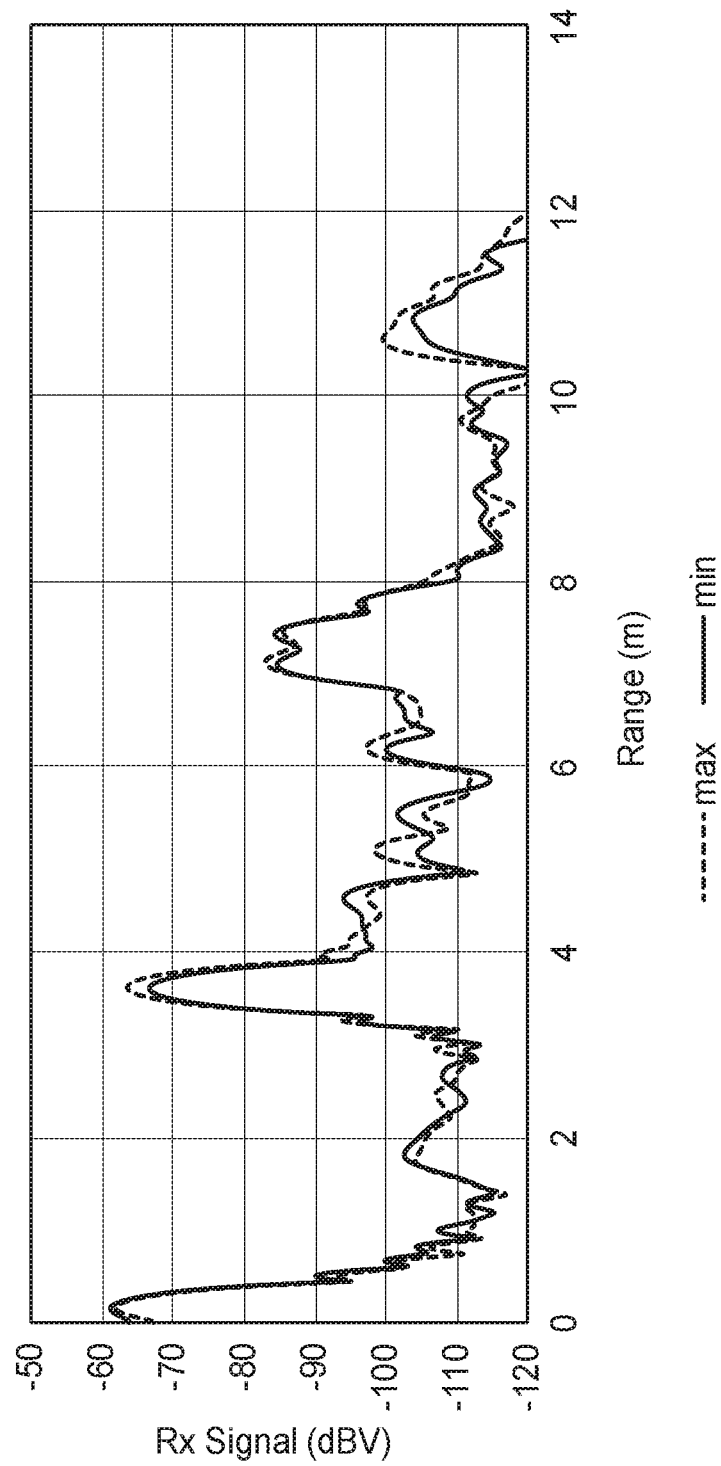
FIG. 8 is a graph of radar signal plots from Example 2.
Figure 9:
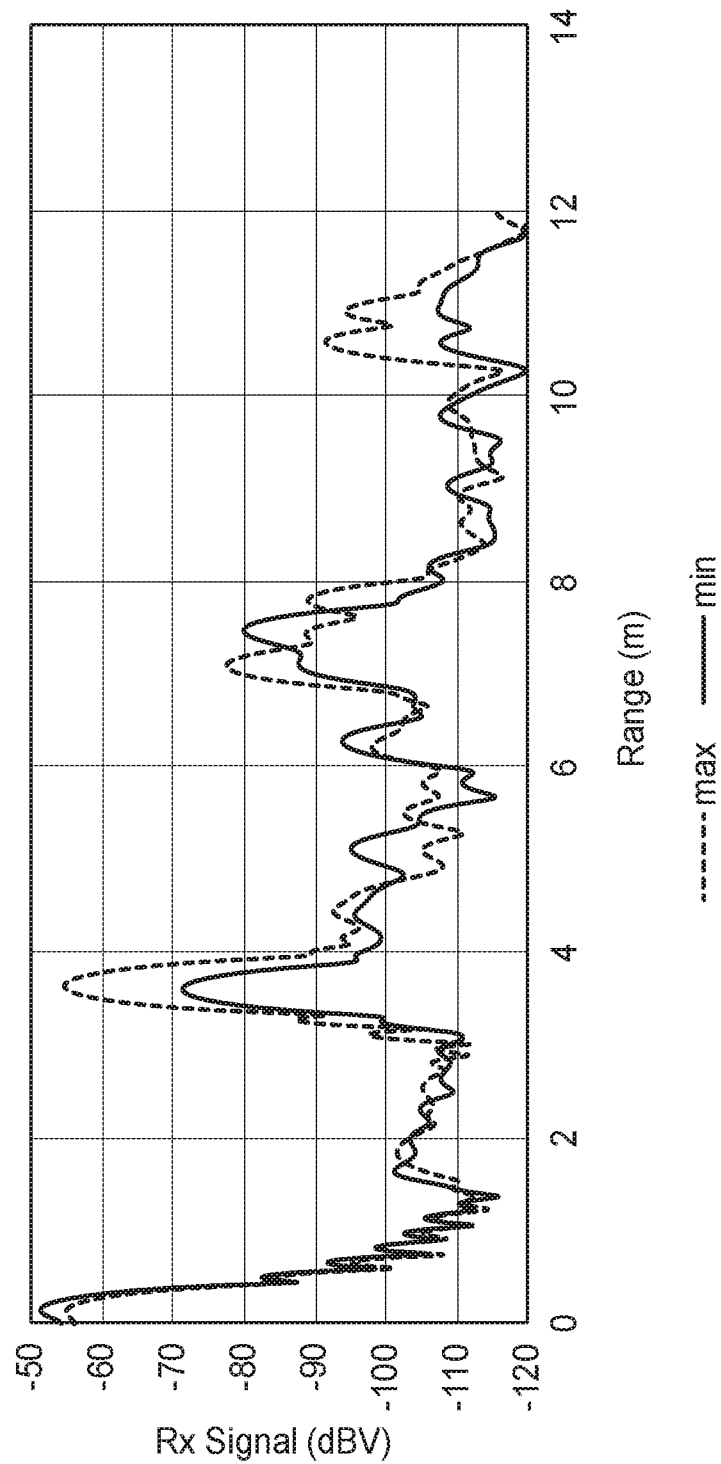
FIG. 9 is a graph of radar signal plots from Example 3.
Figure 10:
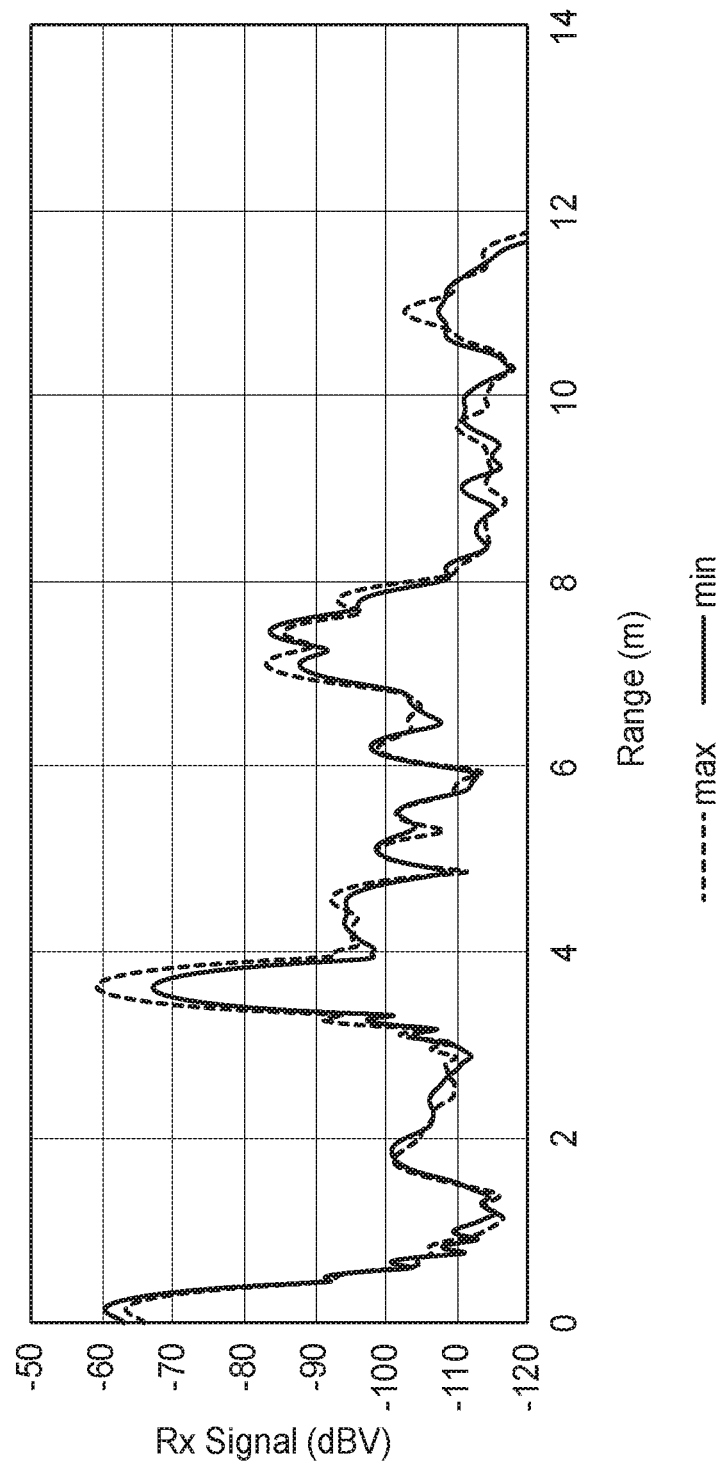
FIG. 10 is a graph of radar signal plots from Comparative Example 2

For some measurements, the sample was attached to a bare polypropylene plate (1 through 3) and for others, the sample was attached to a polypropylene plate that was painted gray (with metallic flakes) in order to increase the reflection from the plate. FIG. 6 shows the radar signal plots from Comparative Example 1 (baseline bare polypropylene plate). FIG. 7 shows the radar signal plots from Example 1 on bare polypropylene plate. FIG. 8 shows the radar signal plots from Example 2 on bare polypropylene plate. FIG. 9 shows the radar signal plots from Example 3 on painted polypropylene plate (corresponding to comparative Example 2). FIG. 10 shows the radar signal plots from Comparative Example 2 (polypropylene plate painted with grey paint including metallic flakes).

Descriptions for elements in figures should be understood to apply equally to corresponding elements in other figures, unless indicated otherwise. The present invention should not be considered limited to the particular examples and embodiments described above, as such embodiments are described in detail in order to facilitate explanation of various aspects of the invention. Rather, the present invention should be understood to cover all aspects of the invention, including various modifications, equivalent processes, and alternative devices falling within the scope of the invention as defined by the appended claims and their equivalents.

What is claimed is:

1. A gradient permittivity film having a first major surface and an opposing second major surface, separated by a thickness, comprising:
    a first continuous matrix of a first component having a first relative permittivity $\varepsilon_{r1}$;
    a second component disposed within the continuous matrix having a second relative permittivity $\varepsilon_{r2}$;
    wherein $\varepsilon_{r1}$ is greater than $\varepsilon_{r2}$ for at least one frequency within a frequency range, the frequency range being between 20 GHz and 300 GHz;
    wherein a relative permittivity of a first half including the half of the thickness of the
    gradient permittivity film closest to the first major surface is lower by at least 10% than a relative permittivity of a second half including the half of the thickness closest to the second major surface, for the at least one frequency within the frequency range;
    wherein the gradient permittivity film has a haze greater than 50% or a transmission of visible light less than 50%; and
    wherein both the first major surface and second major surface are primarily the first component.

2. The gradient permittivity film of claim 1, wherein the second component is disposed within a third component having a third relative permittivity $\varepsilon_{r3}$, and $\varepsilon_{r2} \leq \varepsilon_{r3}$ for the at least one frequency within the frequency range.

3. The gradient permittivity film of claim 2, wherein the third component is glass and the second component is air.

4. The gradient permittivity film of claim 3, wherein the glass is coated with a broadband absorber.

5. The gradient permittivity film of claim 2, wherein the third component is a polymer and the second component is a gas.

6. The gradient permittivity film of claim 5, wherein the polymer is coated with a broadband absorber.

7. The gradient permittivity film of claim 2, wherein the third component is a ceramic and the second component is a gas.

8. The gradient permittivity film of claim 7, wherein the ceramic is porous.

9. The gradient permittivity film of claim 5, wherein the ceramic is coated with a broadband absorber.

10. The gradient permittivity film of claim 1, wherein the first component includes a polymeric material.

11. The gradient permittivity film of claim 1, wherein the continuous matrix is a nonwoven material.

12. The gradient permittivity film of claim 1, wherein the second component is a gas.

13. The gradient permittivity film of claim 1, wherein the second component is air.

14. The gradient permittivity film of claim 1, further comprising a second continuous matrix of a fourth component having a fourth relative permittivity $\varepsilon_{r4}$; wherein the second continuous matrix is disposed on the first continuous matrix.

15. The gradient permittivity film of claim 14, wherein the first component and the fourth component are the same material.

16. The gradient permittivity film of claim 14, wherein the second continuous matrix includes a different, by at least 10%, volume percentage of the second component within its matrix than the first continuous matrix.

17. The gradient permittivity film of claim 16, further comprising a third continuous matrix of a fifth component having a fifth relative permittivity $\varepsilon_{r,5}$, wherein the third continuous matrix is disposed on the first continuous matrix or the second continuous matrix, wherein the third continuous matrix includes a different, by at least 10% volume percentage of the second component within its matrix than either the first continuous matrix or the second continuous matrix.

18. The gradient permittivity film of claim 17, wherein the fifth component, the fourth component, and the first component are the same material.

19. The gradient permittivity film of claim 1, wherein the gradient permittivity film is a single layer.

20. The gradient permittivity film of claim 1 disposed on a substrate, wherein the substrate is a solid layer without the second component.

21. The gradient permittivity film of claim 1, wherein a volume fraction of the second component varies over one or more non-thickness directions of the gradient permittivity film.

22. The gradient permittivity film of claim 21, wherein the variation in the one or more non-thickness directions is a monotonic variation.

23. The gradient permittivity film of claim 1, wherein the gradient permittivity film is non-planar.

24. The gradient permittivity film of claim 1, wherein the first continuous matrix of the first component includes fibers.

25. The gradient permittivity film of claim 1, wherein the gradient permittivity film of claim 1 includes perforations.

26. The gradient permittivity film of claim 25, wherein the perforations are round.

27. The gradient permittivity film of claim 25, wherein the perforations are differently sized.

28. The gradient permittivity film of claim 25, wherein the perforations vary in size, shape, or density over one or more non-thickness directions.

29. The gradient permittivity film of claim 1, wherein the frequency range is between 20 GHz and 120 GHz.

30. The gradient permittivity film of claim 1, wherein the frequency range is between 20 GHz and 100 GHz.

31. The gradient permittivity film of claim 1, wherein the frequency range is between 20 GHz and 81 GHz.

32. The gradient permittivity film of claim 1, wherein the frequency range is between 20 GHz and 30 GHz.

33. A gradient permittivity tape, comprising the gradient permittivity film of claim 1 and an adhesive layer.

34. The gradient permittivity tape of claim 33, further comprising a backing layer disposed on the adhesive layer opposing the gradient permittivity film.

35. An assembly, comprising the gradient permittivity tape of claim 33 attached to a vehicle bumper fascia.

36. The assembly of claim 35, wherein, at a location of attachment of the gradient permittivity tape to the vehicle bumper fascia, a relative permittivity of the vehicle bumper fascia is within 10% of the first relative permittivity.

37. The assembly of claim 36, wherein the relative permittivity of the vehicle bumper fascia is within 5% of the first relative permittivity.

38. An assembly, comprising the gradient permittivity tape of claim 33 attached to an automobile radome.

39. The assembly of claim 38, wherein, at a location of attachment of the gradient permittivity tape and the automobile radome, a relative permittivity of the automobile radome is within 10% of the first relative permittivity.

40. The assembly of claim 39, wherein the relative permittivity of the automobile radome is within 5% of the first relative permittivity.

\* \* \* \* \*